United States Patent
Sheaffer et al.

[19]

[11] Patent Number: 5,950,567
[45] Date of Patent: Sep. 14, 1999

[54] MULTIPLE DOSAGE FEEDER FOR ANIMAL CAGE

[75] Inventors: John E. Sheaffer, Perryville, Md.; Theodore William Frentzel, Jr.; Arvind Krishna Bhide, both of Newark, Del.; Charles Elwood Cover, Elkton, Md.

[73] Assignee: Lab Products, Inc., Seaford, Del.

[21] Appl. No.: 08/742,852

[22] Filed: Nov. 1, 1996

[51] Int. Cl.⁶ .................................................. A01K 5/00
[52] U.S. Cl. ................................................................ 119/477
[58] Field of Search ..................... 119/51.11, 456, 119/464, 475, 477, 478, 54

[56] References Cited

U.S. PATENT DOCUMENTS

| | | | |
|---|---|---|---|
| 1,719,769 | 7/1929 | Kaufman | 119/475 |
| 2,528,742 | 6/1950 | Coffing . | |
| 2,753,840 | 7/1956 | Petrie . | |
| 3,046,939 | 7/1962 | Vlach . | |
| 3,050,029 | 8/1962 | Appleton | 119/51.11 |
| 3,468,291 | 9/1969 | Allen . | |
| 3,999,519 | 12/1976 | Rodemeyer | 119/475 |
| 4,000,719 | 1/1977 | Richards et al. . | |
| 4,059,072 | 11/1977 | Vasallo et al. . | |
| 4,422,409 | 12/1983 | Walker et al. . | |
| 4,450,790 | 5/1984 | Stansbury, Jr. . | |
| 4,485,765 | 12/1984 | Schwartz et al. . | |
| 4,492,183 | 1/1985 | Chiotasso et al. . | |
| 4,617,874 | 10/1986 | Zammarano . | |
| 4,671,210 | 6/1987 | Robinson et al. . | |
| 4,989,547 | 2/1991 | Eaton . | |
| 5,152,247 | 10/1992 | Brown | 119/464 |
| 5,199,381 | 4/1993 | Masopust | 119/51.11 X |
| 5,377,620 | 1/1995 | Phillips . | |

FOREIGN PATENT DOCUMENTS

| | | |
|---|---|---|
| 464942 | 5/1937 | United Kingdom . |
| 2 166 934 | 5/1986 | United Kingdom . |
| 2199477 | 7/1988 | United Kingdom . |

*Primary Examiner*—Thomas Price
*Attorney, Agent, or Firm*—Stroock & Stroock Lavan LLP

[57] ABSTRACT

A multiple dosage feeder for a cage is provided. The multiple dosage feeder includes a frame having a cage-interior side, a food holding member rotatably mounted on the frame, and a food presentation member disposed on the cage-interior side of the frame. The food holding member holds a plurality of measured dosages of food or other substances, and at least a portion of the food holding member extends to the cage-interior side of the frame. The food presentation member permits access to a single dosage of the plurality of dosages by an animal within the cage. At least a portion of the food holding member is rotatable within the food presentation member so as to expose the single dosage of the plurality of dosages, while the food presentation member prevents access to any remaining dosages on the cage-interior side of the frame.

14 Claims, 7 Drawing Sheets

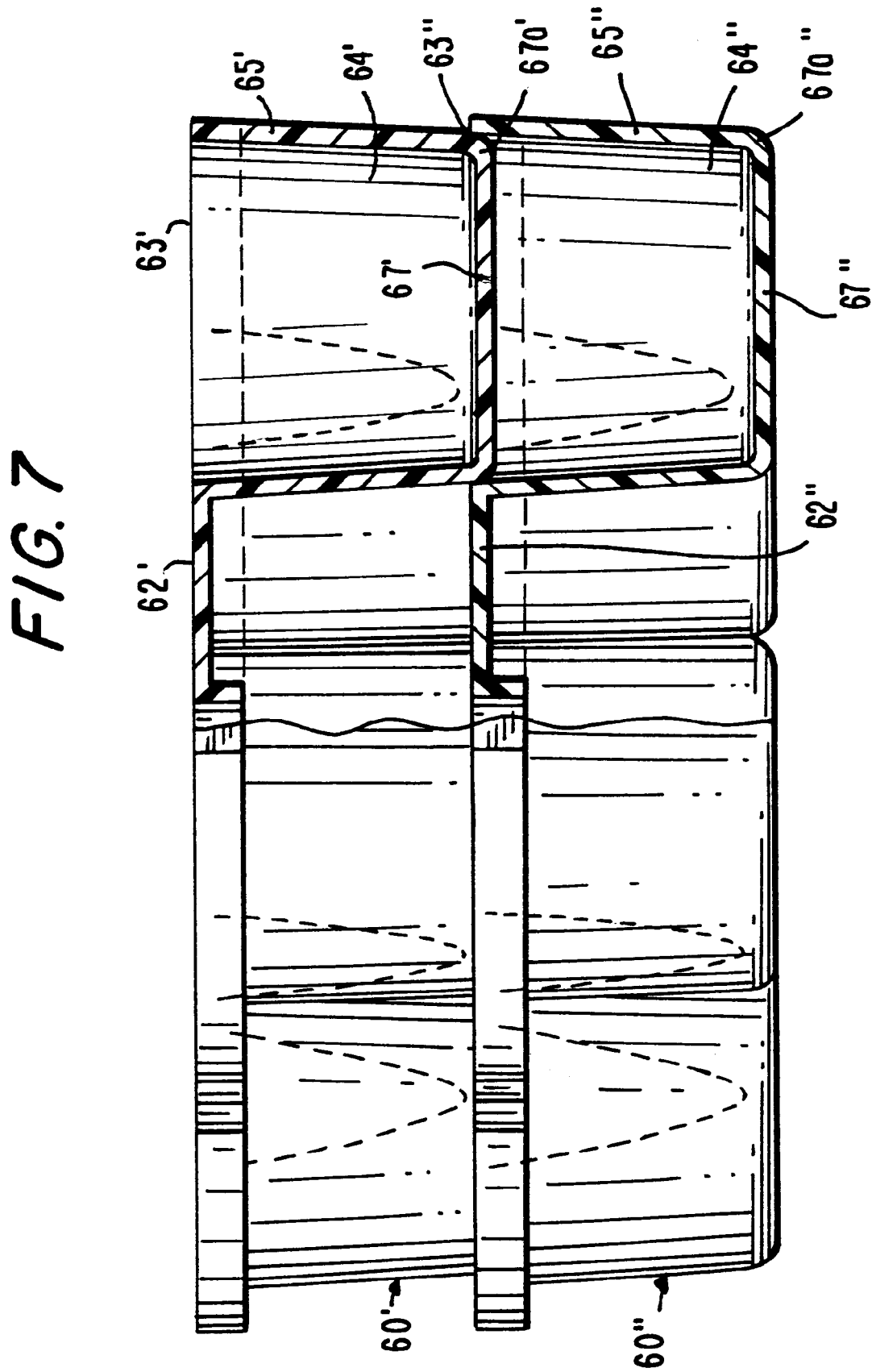

MULTIPLE DOSAGE FEEDER FOR ANIMAL CAGE

BACKGROUND OF THE INVENTION

This invention relates generally to a feeder for an animal cage, and more particularly to a multiple dosage feeder which selectively exposes one of a plurality of precise dosages of food or other substances to an animal within the cage while covering the remaining dosages.

Animals used in laboratory experiments and housed in cages must be supplied with a nutritionally adequate amount of food to allow for normal growth and development, as well as to permit such animals to ingest various substances in the food for experimental purposes. While it is often not difficult to encourage an animal to eat, many animals which are commonly used in laboratory experiments, such as rats and mice, have a tendency to overeat. In fact, these animals may gorge themselves on any food presented to them and will continue to eat until they become obese and develop obesity-related diseases, often resulting in premature death and thus ruining the experiment. Accordingly, it is important to administer only a measured dosage of food to such animals to prevent such harm. Additionally, in certain experiments, such as those conducted in toxicology labs, it is very important to control and keep track of the exact quantity of food ingested by the animal. Therefore, even where such animals do not die, it is often important to administer only a measured dosage of food at predetermined intervals to control the results of the experiment, and it must be assured that the animal in the experiment does not eat too much food at any given interval.

Traditionally, the administration of measured dosages of food to laboratory animals in cages has been accomplished manually. Typically, laboratory personnel must: (1) measure a single dosage of food into a container; (2) open the cage; (3) remove the empty single-dosage container from the cage; (4) place the filled single-dosage container within the cage; and (5) close the cage. This procedure must be performed once for each cage in the experiment at every feeding interval.

The manual method of administering measured dosages of food suffers from several drawbacks. First, the sheer number of steps involved for each feeding operation makes the process slow and cumbersome. Second, the repetitive nature of the operations increases the likelihood of personnel developing ergonomic injuries. Third, the necessity of opening the cage to remove the empty food container and to insert the filled food container increases the likelihood that the animal within the cage will escape, increases the exposure and hazardous proximity of laboratory personnel to the animal, and inhibits automation of the feeding process. Fourth, since laboratory animals may eat food rapidly, it is possible for laboratory personnel to accidentally feed some animals twice because there is no separate indication as to whether a particular animal has received the current dosage of food.

Accordingly, it is desired to provide a multiple dosage feeder for an animal cage which selectively provides one of a plurality of dosages of food to an animal within a cage in a structure which limits the animal to eating a single dosage at a feeding interval, reduces the number of steps and the time required to administer measured dosages of food to each cage, indicates whether a particular dosage has been administered, and eliminates the necessity of opening the cage to administer the measured dosages of food.

SUMMARY OF THE INVENTION

Generally speaking, in accordance with the instant invention, a multiple dosage feeder for an animal cage which selectively provides exact dosages of food to an animal within a cage is provided. The feeder has a frame dividing a cage interior side from a cage exterior side. A food holding member is rotatably mounted on the frame and holds a plurality of measured dosages of food. At least a portion of the food holding member extends within the cage to the cage interior side of the frame. In a preferred embodiment the food holding member is a carousel. A cage exterior cover prevents contamination and access to the dosages of food when they are positioned on the exterior side of the frame. A cage interior cover prevents contamination and access to those dosages extending to the cage interior side of the frame and selectively provides access to a single dosage of food presented at the cage interior.

Accordingly, it is an object of the invention to provide a multiple dosage feeder which selectively provides one of a plurality of dosages of food to an animal within a cage.

Another object of the invention is to provide a multiple dosage feeder which limits an animal within a cage to eating a single dosage of food at a single feeding interval.

A further object of the invention is to provide a multiple dosage feeder which reduces the number of discrete steps and the time required to administer measured dosages of food to an animal within a cage.

Still another object of the invention is to provide a multiple dosage feeder for an animal cage which does not require that the cage be opened to administer the measured dosages of food.

A still further object of the invention is to provide a multiple dosage feeder which exposes a single precise dosage of food to an animal within a cage while keeping the remaining dosages of food unexposed.

Yet another object of the invention is to provide a multiple dosage feeder for an animal cage which provides a visual indication that the animal within the cage is receiving or has received a particular dosage of food.

A yet still further object of the invention is to provide a multiple dosage feeder for an animal cage which permits a plurality of measured-dosage trays or carousels to be stacked for efficient use in an automated food dosage machine and for easy storage.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 7 is an elevational view, in partial section, of two stacked feeder carousels constructed in accordance with the present invention.

DETAILED DESCRIPTION OF THE PREFERRED EMBODIMENTS

Figure 1:
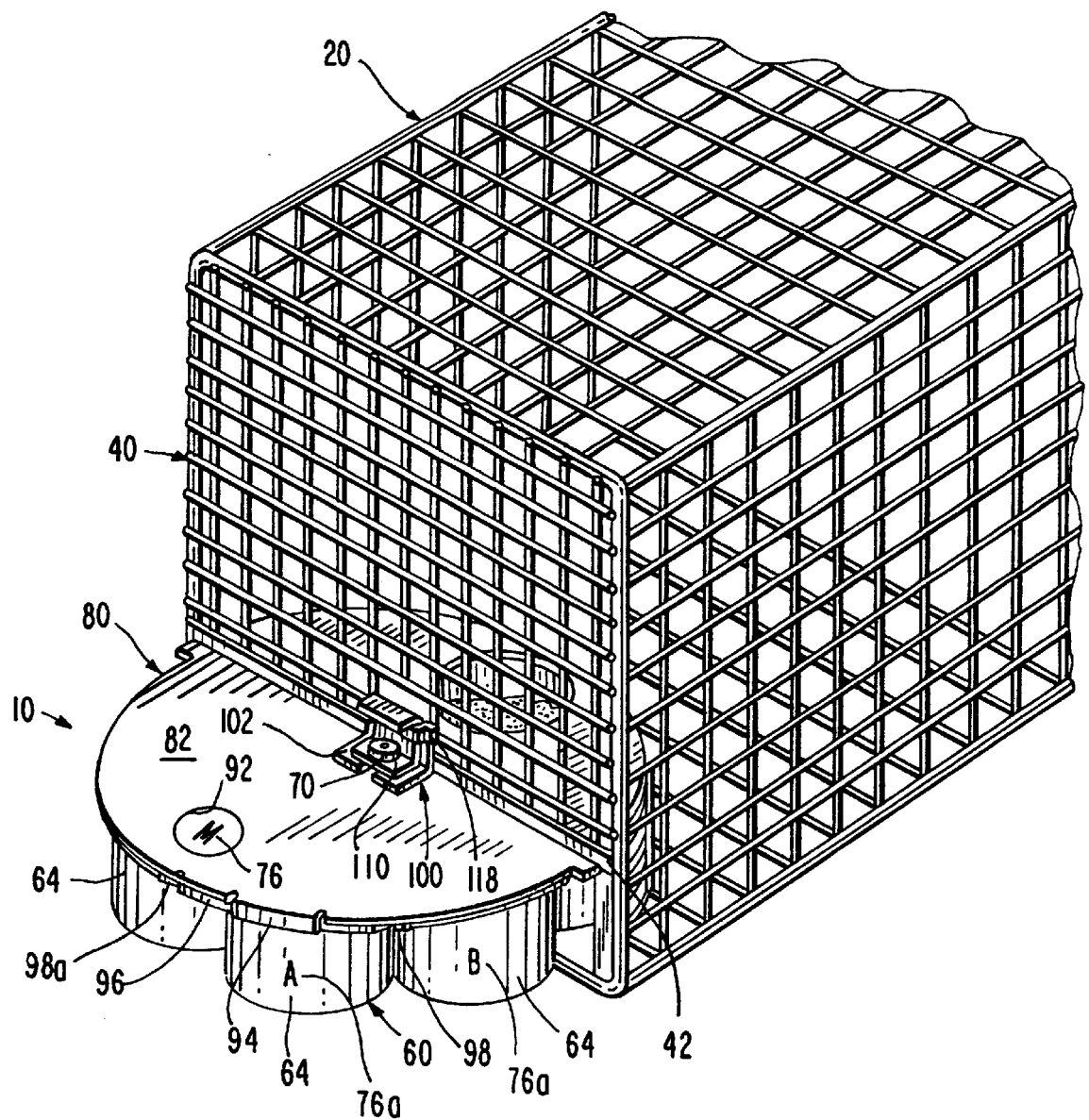
FIG. 1 is a cage-exterior perspective view of a multiple dosage feeder for an animal cage constructed in accordance with the present invention.
Figure 2:
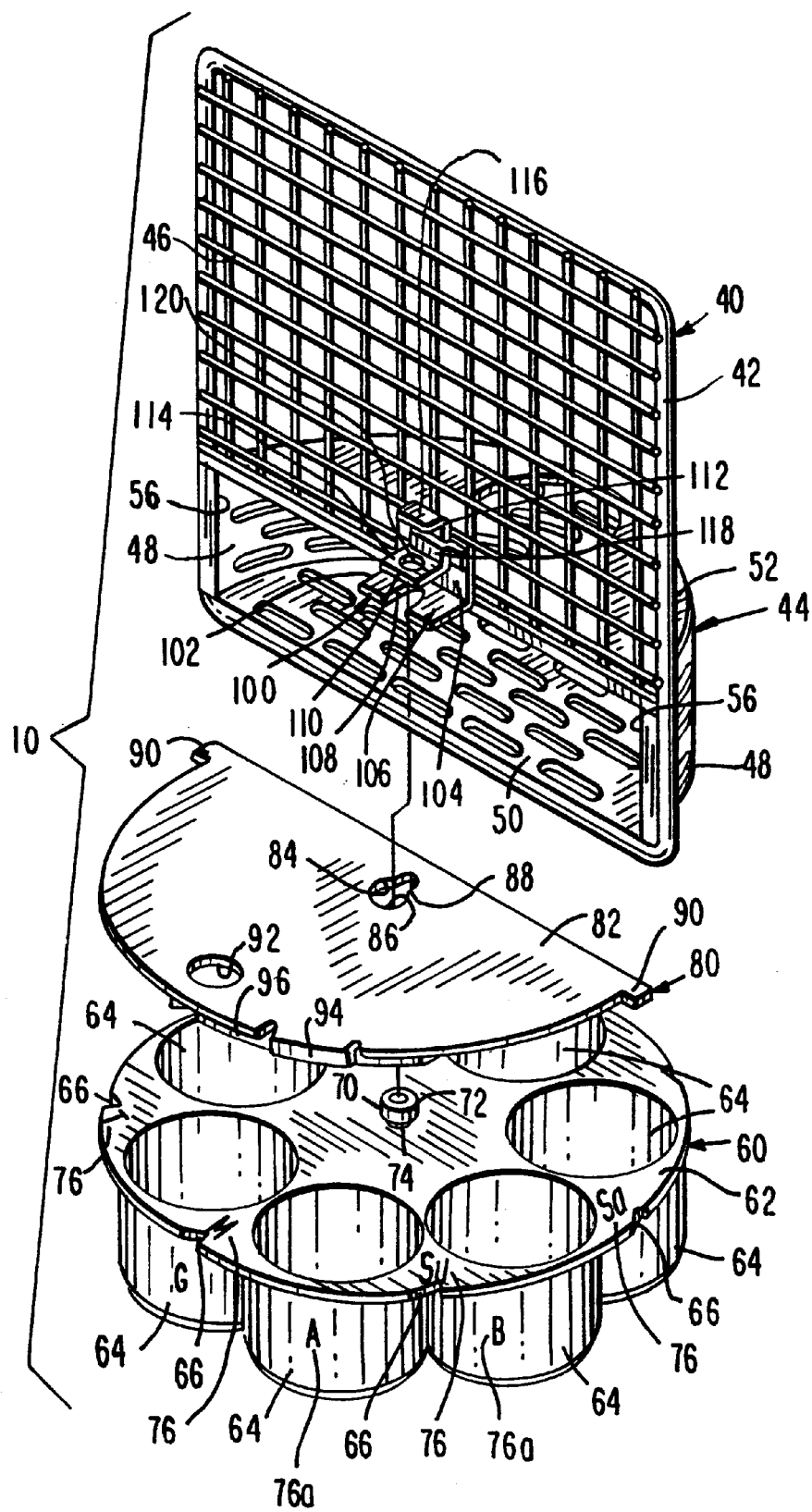
FIG. 2 is an exploded cage-exterior perspective view of a multiple dosage feeder for an animal cage constructed in accordance with a first embodiment the present invention.

Reference is first made to FIGS. 1 and 2, wherein a multiple dosage feeder, generally indicated at 10, constructed in accordance with the invention is shown. While the present invention is particularly suited for feeding rats and mice, it is to be understood that the invention is equally applicable to feeding other animals, such as rabbits for example. Multiple dosage feeder 10 is utilized in conjunction with an animal cage, generally indicated at 20. Although a wire-bar mesh animal cage is depicted and described herein, it is to be understood that multiple dosage feeder 10 may be used with any type of cage, such as cages made of transparent plastic, for example. Multiple dosage feeder 10 includes a frame 40, a food holding member 60, preferably formed as a carousel, and a cage-exterior cover 80.

Generally speaking, carousel 60 contains measured dosages of food for animals within cage 20. Carousel 60 is rotatably mounted within frame 40 to expose a single dosage of food to animals within cage 20, while a portion of frame 40 and cage-exterior cover 80 cover all dosages of food in carousel 60 except for the one dosage of food exposed to animals within cage 20.

Figure 5:
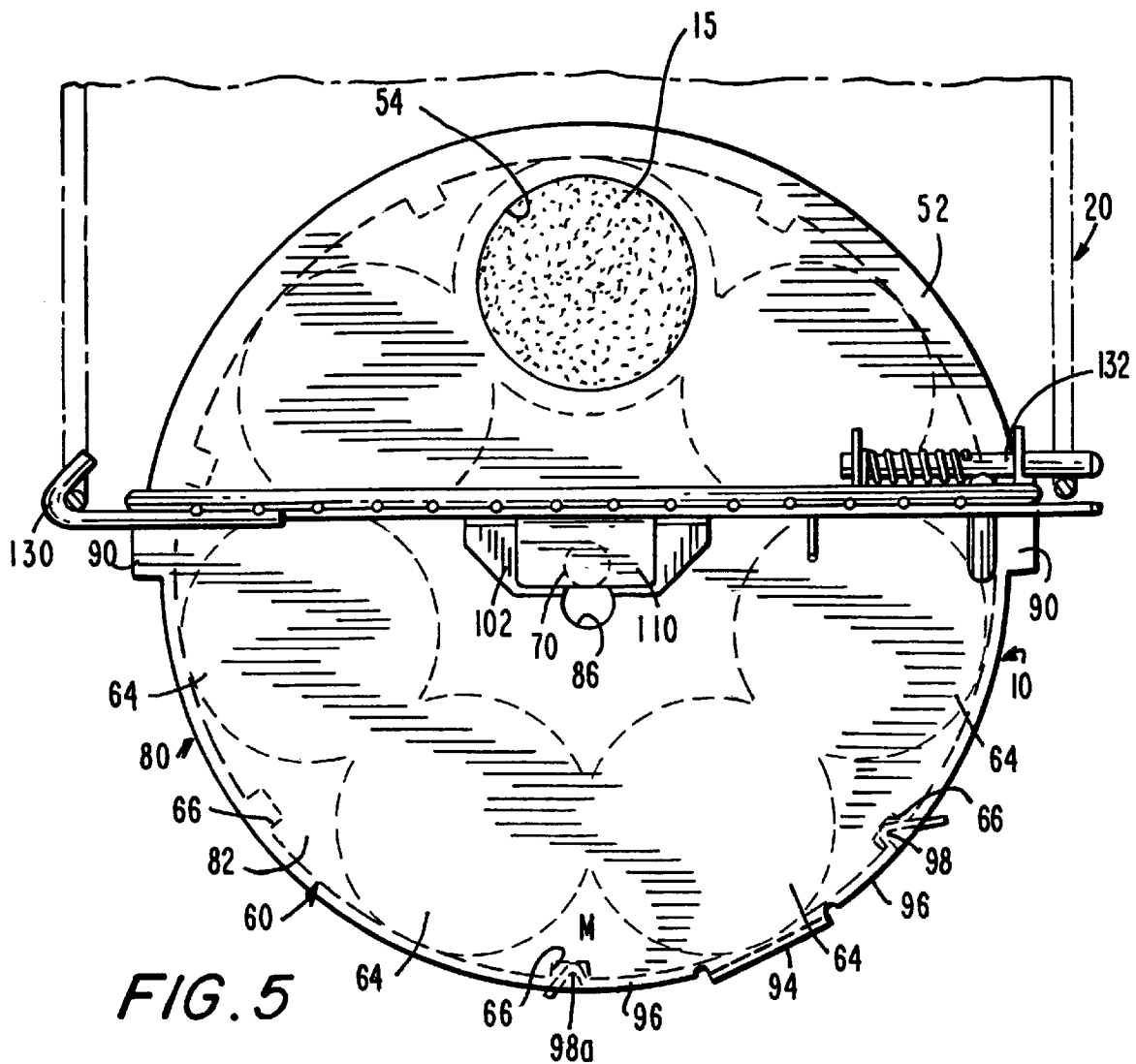
FIG. 5 is a top plan view of a multiple dosage feeder for an animal cage constructed in accordance with the present invention.
Figure 6:
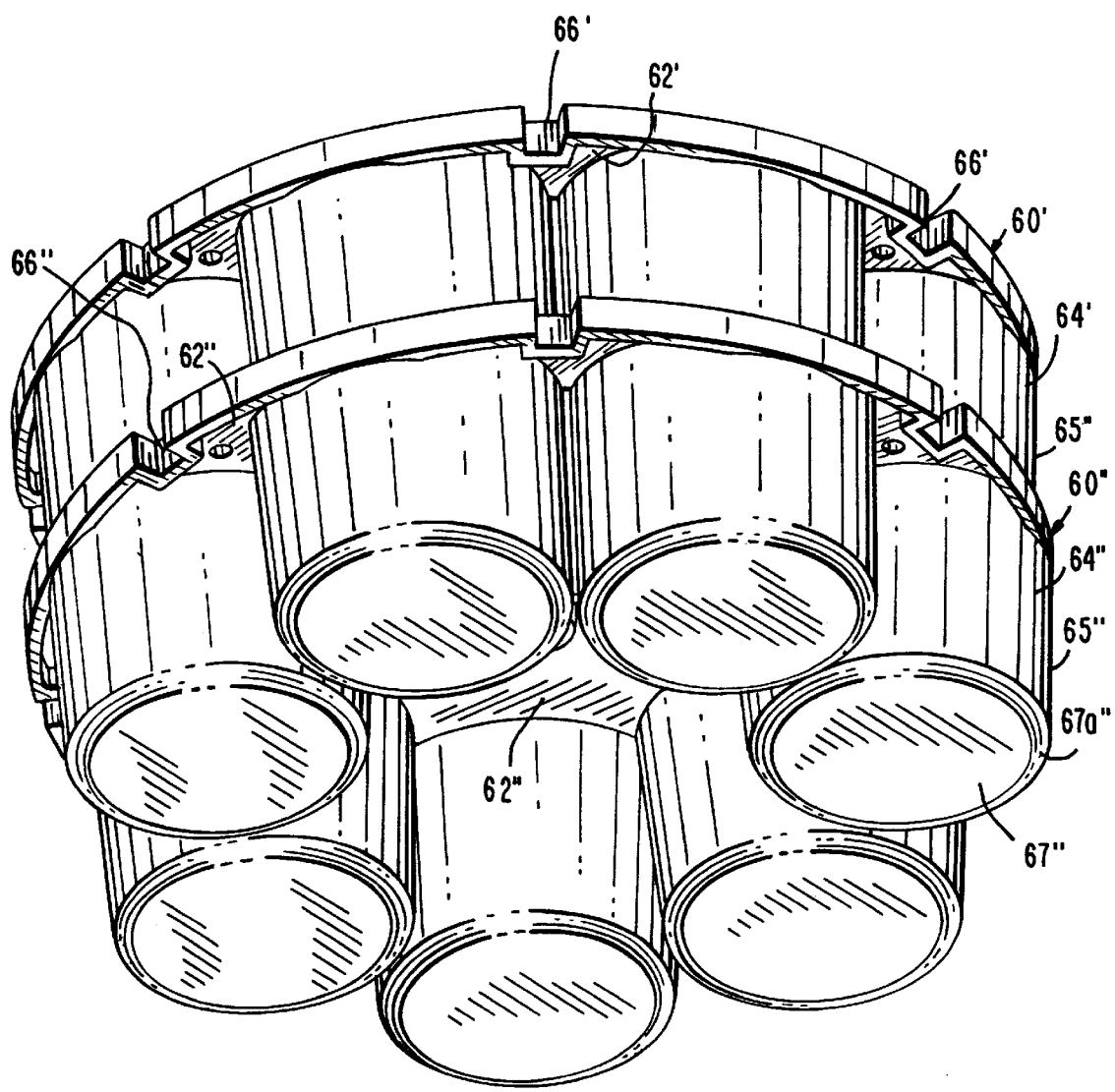
FIG. 6 is a perspective view of two stacked feeder carousels constructed in accordance with the present invention.

As shown in FIGS. 2, 5 and 6, carousel 60 comprises a substantially circular tray for holding measured dosages of food for animals within cage 20. Carousel 60 includes a substantially circular platform member 62. A plurality of food containers 64, preferably shaped like cups, depend from platform member 62. Each food container 64 has an open top and may hold a single, measured dosage of food 15 for animals within cage 20 for a single feeding interval. Each container 64 includes side walls 65, a bottom 67 and an opening 63 within platform 62. In a preferred embodiment, the outer perimeter of platform member 62 is provided with a plurality of evenly spaced ratchet notches 66. One ratchet notch 66 is provided for each food container 64, and ratchet notches 66 are preferably provided at points on the outer perimeter of platform member 62 which are laterally between adjacent food containers 64. Carousel 60 further includes a spindle 70 including a head 72 and a neck 74 which is narrower in diameter than head 72. Platform member 62 may also be provided with a plurality of indicia 76 near the outer perimeter of platform member 62 between adjacent food containers 64 or on outer surfaces of individual food containers to indicate which container 64 is being presented to an animal within cage 20. Platform member 62 and containers 64 of carousel 60 are preferably constructed as an integral unit from a durable and easily cleaned material such as plastic. Spindle 70 is preferably constructed of a wear-resistant material such as stainless steel.

Figure 3:
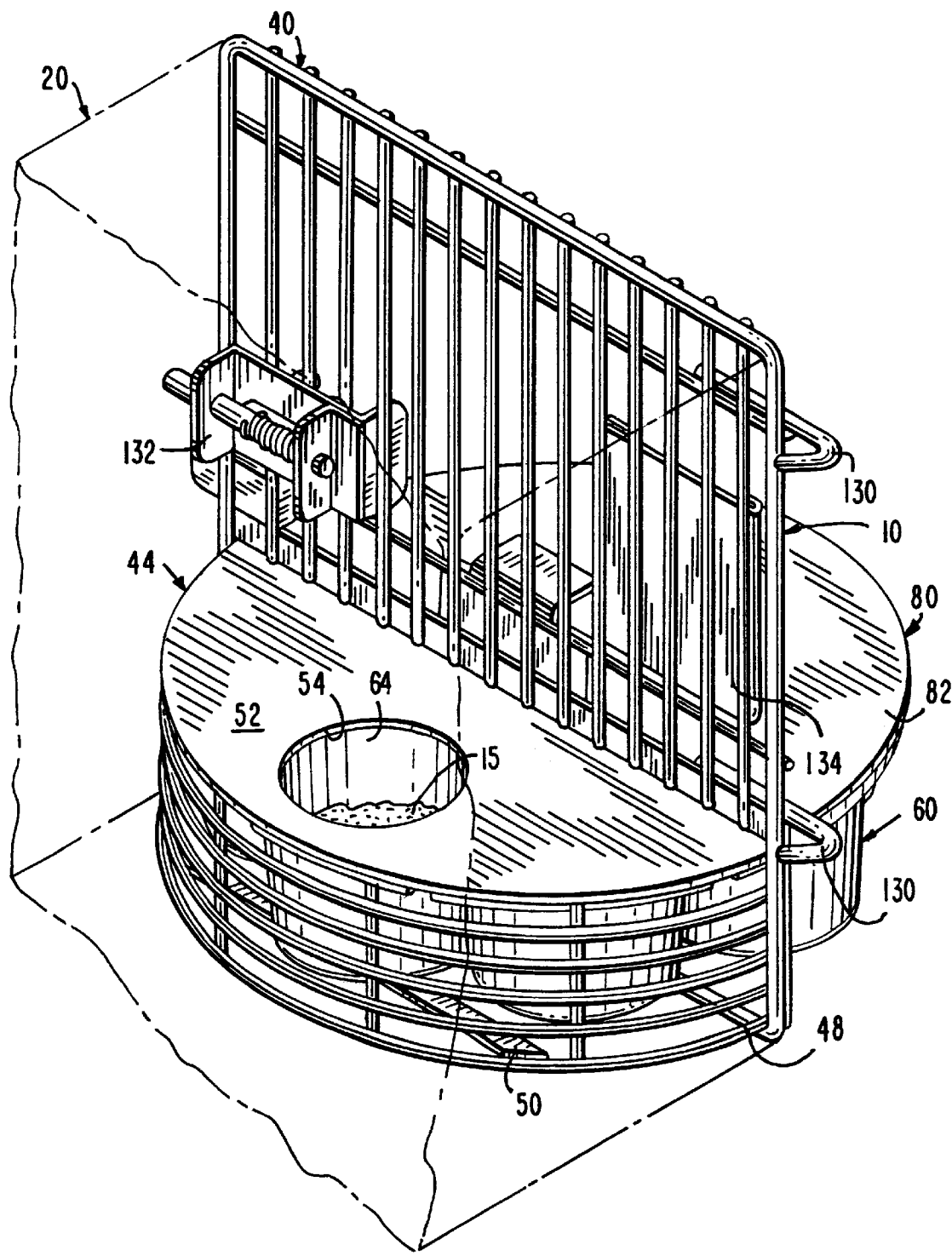
FIG. 3 is cage-interior perspective view of a multiple dosage feeder for an animal cage constructed in accordance with a second embodiment of the present invention.

As shown in FIGS. 2 and 3, frame 40 includes a framing member 42. A semicylindrical food presentation member, generally indicated at 44, is disposed within a portion of framing member 42, while the remainder of framing member 42 is provided with a barrier 46 constructed of wire-bar mesh or other suitable material, such as transparent plastic, to form a cage wall. Together, food presentation member 44 and barrier 46 prevent animals within cage 20 from escaping through the portion of cage 20 occupied by frame 40.

As shown in FIGS. 3 and 5, food presentation member 44 includes a semicylindrical peripheral guard 48 extending across a portion of framing member 42 and substantially centered within the frame in the horizontal direction. Peripheral guard 48 defines a carousel receiving opening 56 within framing member 42. Food presentation member 44 further includes a lower guard 50 forming a floor to peripheral guard 48 and a cage-interior cover 52 forming a covering to the area defined by peripheral guard 48. Peripheral guard 48 and lower guard 50 may be constructed of a perforated plate as shown in FIG. 2, or a wire-bar mesh as shown in FIG. 3, or solid walls, or other suitable configurations. Cage-interior cover 52 is constructed of a rigid material resistant to biting and scratching of animals within the cage, such as stainless steel. Peripheral guard 48, lower guard 50 and cage-interior cover 52 together form an enclosure which is dimensioned to receive a sufficient portion of carousel 60 through carousel-receiving opening 56 to permit at least one container 64 of carousel 60 to be positioned on the cage-interior side of frame 40 (that is, the side of frame 40 on which animals are housed within cage 20). As shown in FIGS. 3 and 5, cage-interior cover 52 is provided with a feeding opening 54 which is shaped and sized so as to permit access to a single container 64 of carousel 60 therethrough, while the remainder of cage-interior cover 52 is solid so as to cover the tops of all other containers 64 on the cage-interior side of frame 40.

As shown in FIGS. 2 and 5, cage-exterior cover 80 includes a solid cover plate 82. Cover plate 82 is dimensioned so as to cover the tops of containers 64 of carousel 60 which are on the cage-exterior side of frame 40 when carousel 60 is mounted to frame 40 as described below. In a preferred embodiment, cover pate 82 is semicircular to cover those portions of carousel 60 not covered by cage-interior cover 52, with the exception of feeding opening 54. Cover plate 82 is provided with a keyhole-shaped aperture 84 comprising a circular wide opening 86 communicating with a U-shaped narrow opening 88, the U-shaped narrow opening forming the center of the circle about which semicircular plate 82 is dimensioned. Wide opening 86 allows head 72 of spindle 70 to pass therethrough. Narrow opening 88 allows neck 74 of spindle 70 to pass therethrough but closely surrounds neck 74, thereby preventing head 72 from passing vertically therethrough yet permitting neck 74 to freely rotate within narrow opening 88.

Cover plate 82 may be provided with outer tabs 90. Cover plate 82 may be further provided with an indicator hole 92 positioned such that one of the plurality of indicia 76 of carousel 60 is visible through indicator hole 92 when carousel 60 is mounted to frame 40 and a container 64 is positioned beneath food opening 54 of food presentation member 44. Cage-exterior cover 80 may also include a ratchet stop 96 attached to a flange 94 which depends from the outer perimeter of cover plate 82. Ratchet stop 96 comprises a bent band of a resilient material, such as stainless spring steel, and is provided with at least one, and preferably two, teeth 98 which are biased by the resiliency of the material toward aperture 84. Teeth 98, 98a are disposed at a distance from one another substantially equal to the distance between adjacent ratchet notches 66 on carousel 60 so as to be received in a respective ratchet notch 66 as ratchet notches 66 are rotated to pass beneath teeth 98, 98a. Teeth 98, 98a acting together prevent rotation of carousel 60. The disengagement of either tooth 98, 98a permits rotation of carousel 60 in one direction.

Teeth 98, 98a are formed at opposing angles. Accordingly, if tooth 98 is disengaged, rotation of carousel 60 is permitted in the counterclockwise direction (with respect to the view depicted in FIG. 5) but prevented from rotation in the clockwise direction by tooth 98a. Likewise, rotation of carousel 60 is permitted in the clockwise direction when tooth 98a is disengaged from ratchet notch 66 and prevented in the counterclockwise direction by tooth 98. Accordingly, a simple one-handed operation of carousel 60 is provided. Tooth 98 or 98a is disengaged from notch 66 through the use of an operator's thumb/finger and the remaining fingers/thumb are used to rotate carousel 60 in the allowable direction. In a preferred embodiment, tooth 98 is larger and easier to disengage than tooth 98a, thus encouraging the selective disengagement of tooth 98 to thereby encourage rotation of carousel 60 in a single direction.

A fastener, generally indicated at 100, is provided on frame 40 for rotatably fastening carousel 60 to frame 40. Fastener 100 is disposed substantially in the center of the frame in the horizontal direction. Fastener 100 includes a drop lock hanger 102 which is substantially L-shaped in vertical cross-section and comprises a back plate 104 and a hang plate 106 extending perpendicularly from back plate 104. Back plate 104 of drop lock hanger 102 is mounted to frame 40 above carousel-receiving opening 56 so that hang plate 106 extends outward from the cage-exterior side of frame 40. Hang plate 106 includes a U-shaped slot 108 which is sufficiently wide to accept neck 74 of spindle 70 but insufficiently wide to allow head 72 to pass vertically therethrough. Fastener 100 also includes a drop lock 110 which is slidably retained to drop lock hanger 102 by a slide retainer 118. Drop lock 110 includes a slider plate 112 which is freely slidable between drop lock hanger 102 and slide retainer 118. A lock plate 114 extends from the bottom end of slider plate 112 substantially parallel to hang plate 106, while a handle plate 116 extends substantially perpendicularly from the top end of slider plate 112. A retaining hole 120 is provided in lock plate 114 such that retaining hole 120 is concentric with the inner, curved end of U-shaped slot 108. Handle plate 116 may be lifted and lowered to raise and lower lock plate 114 with respect to the fixed hang plate 106.

To assemble multiple dosage feeder 10, cage-exterior cover 80 is first placed atop carousel 60. In particular, head 72 of spindle 70 is passed through wide opening 86 of aperture lo 84, and cage-exterior cover 80 is then slid laterally along platform member 62 of carousel 60 so that neck 74 of spindle 70 is received within narrow opening 88, and head 72 is positioned above at least a portion of cover plate 82 surrounding narrow opening 88, thereby securing cage-exterior cover 80 to carousel 60. In addition, cage-exterior cover 80 is rotated about spindle 70 so that teeth 98 of ratchet stop 96 are received within ratchet notches 66 on carousel 60, thereby preventing rotational movement of cage-exterior cover 80 with respect to carousel 60.

Figure 4:
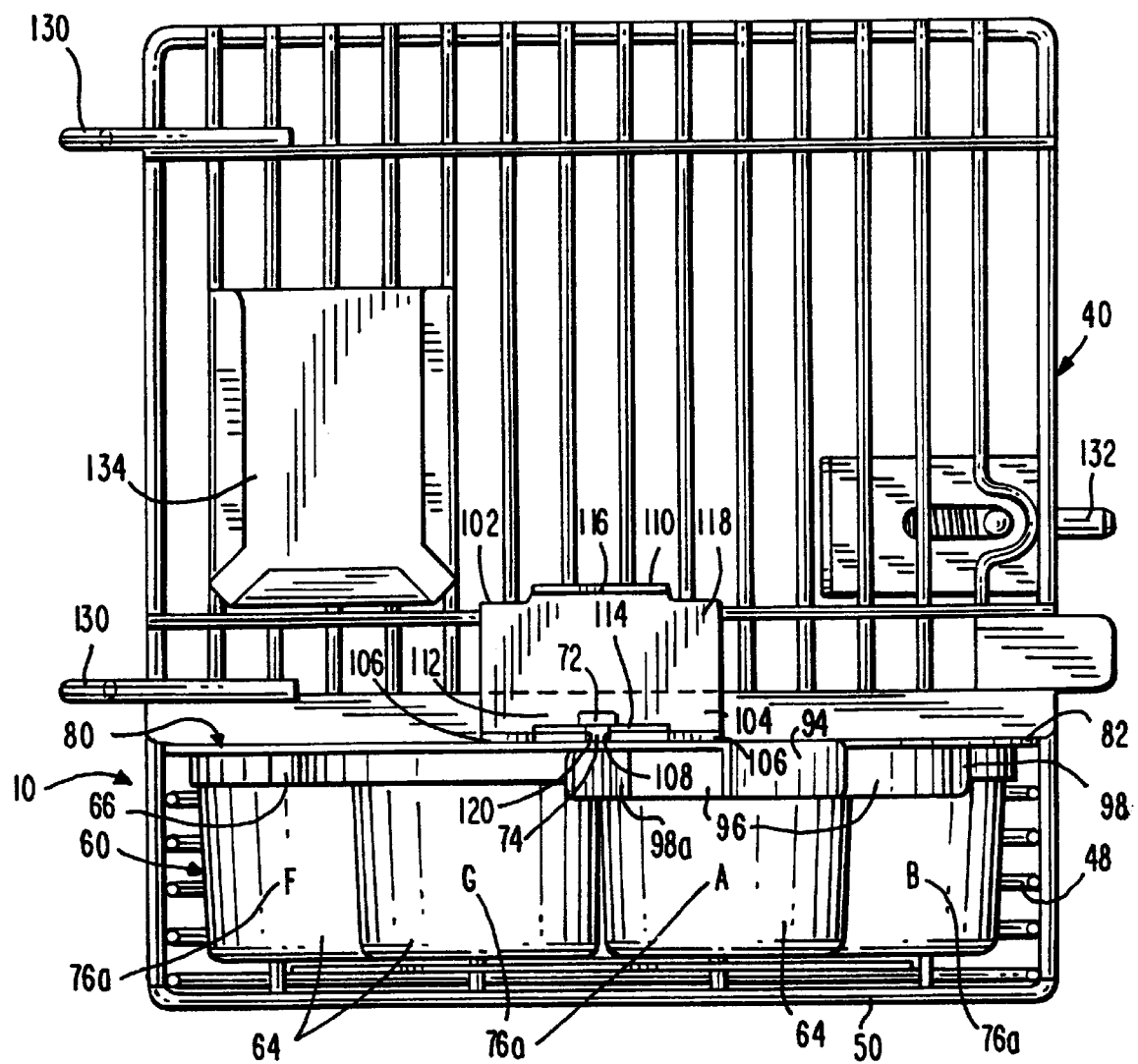
FIG. 4 is a cage-exterior elevational view of a multiple dosage feeder for an animal cage constructed in accordance with the present invention.

Next, the carousel 60 and cage-exterior cover 80 assembly is mounted to frame 40 using fastener 100 as shown in FIGS. 1, 3, 4 and 5. Handle plate 116 of drop lock 110 is lifted to separate lock plate 114 from hang plate 106 as shown in FIG. 2. The portion of carousel 60 which is not covered by cage-exterior cover 80 is then inserted into food presentation member 44 through carousel-receiving opening 56 of frame 40. Neck 74 of spindle 70 is passed through Ushaped slot 108 in hang plate 106 so that head 72 is disposed between hang plate 106 and lock plate 114. At this point, carousel 60 is secured to frame 40 in all but one direction: namely, the direction of insertion and removal of neck 74 of spindle 70 into and out of U-shaped slot 108 of drop lock hanger 102. Handle plate 116 of drop lock 110 is then lowered to lower lock plate 114 over spindle 70 thereby passing head 72 through retaining hole 120 as shown in FIGS. 1 and 4. In this manner, head 72 of spindle 70 is locked in place by drop lock 110. Neck 74 of spindle 70 rotates freely with U-shaped slot 108 of drop lock hanger 102, and head 72 of spindle 70 rotates freely within retaining hole 120 of drop lock 110. Carousel 60 is thus rotatably mounted to frame 40 by fastener 100.

During use, a prescribed dosage of food 15 is placed in each container 64 of a carousel 60. Each carousel 60 is then incorporated into a multiple dosage feeder 10 as described above. When fully assembled, multiple dosage feeder 10 presents the contents 15 of one container 64 of carousel 60 to animals within cage 20 through feeding opening 54 of food presentation member 44. Food presentation member 44 and frame 40 prevent animals within cage 20 from gaining premature access to other dosages of food, and food presentation member 44 protects carousel 60 itself from damage incurred by animals within cage 20.

Ratchet notches 66 of carousel 60 and teeth 98 of ratchet stop 96 are configured and disposed so that when teeth 98 are received by ratchet notches 66, exactly one container 64 is aligned with feeding opening 54. Ratchet stop 96 holds carousel 60 in place preventing rotation of carousel 60 by the animal, maintaining only the desired container 64 in the exposed orientation. In this orientation, one of the plurality of indicia 76 of carousel 60 appears within indicator hole 92 of cover 80. Thus, one indicium 76 corresponds to each container 64 of carousel 60 and may indicate information regarding the food 15 of the particular container 64 which is exposed to the animal within cage 20 through feeding opening 54 of food presentation member 44. For example, seven containers 64 could be provided in carousel 60, one for each day of a week, and the indicia 76 could indicate which day's food 15 is being administered to the animal within cage 20. Preferably, the indicia 76 may be displayed as indicia 76a on the outer facing surface of side walls 65 of containers 64 such that the indicia are visible while facing a rack of cages, and hole 92 may be omitted which removes an entry for potential contamination of the dosages.

When it is necessary to present a fresh, measured dosage of food 15 to the animal within cage 20, carousel 60 is simply rotated with respect to frame 40. In particular, one tooth 98, 98a is disengaged and carousel 60 is rotated to force teeth 98, 98a of ratchet stop 96 outwards, and carousel 60 is rotated until teeth 98, 98a are received by the next notch 66 or notches 66 in carousel 60 along the outer perimeter of plate member 62 thus indexing the food relative to opening 54. Once this has occurred, a new container 64 with fresh food or other substances 15 is presented to the animal within cage 20 through feeding opening 54 of food presentation member 44. In addition, another indicium 76 is displayed through indicator hole 92 of cage-exterior cover 80 to indicate to laboratory personnel that a new dosage of food 15 has been administered to the animal. It should be noted that tabs 90 of cage-exterior cover 80 project beyond the sides of carousel-receiving opening 56 of frame 40 to prevent cage-exterior cover 80 from being rotated, along with carousel 60, into food presentation member 44.

Thus, a plurality of dosages of food or other materials may be measured into containers 64 of carousel 60 and loaded simultaneously into multiple dosage feeder 10. At any particular time, the contents 15 of only one container 64 are presented to an animal within cage 20 through feeding opening 54 of food presentation member 44. The remainder of the containers 64 are covered, and the contents 15 therein are kept protected from contamination, by either cage-interior cover 52 or cage-exterior cover 80.

Frame 40 may comprise a door for cage 20, and may therefore be provided with hinges 130 and a latch or locking mechanism 132 (FIG. 4) as known in the art. In addition, for ready identification of animals within cage 20, their feeding regimens or schedules, or other experimental data, a card holder 134 may be provided on frame 40 for removably placing a card displaying such data thereon. Frame 40 may also comprise a panel or side of cage 20 or any other portion of cage 20 appropriate for feeding animals within cage 20. In some arrangements, food presentation member 44 may be mounted directly to the cage instead of to a discrete frame 40.

As shown in FIGS. 6 and 7, carousel 60 is preferably configured such that a first carousel 60' is stackable and/or nestable upon a second carousel 60". Side walls 65 are tapered slightly inward from opening 63 to bottom 67 so that bottoms 67' of first carousel 60' partially fit within openings 63" of second carousel 60". The exterior corner of each bottom 67', 67" has a corner radius 67a', 67a', respectively, to control partial stacking or nesting. Bottom 67" is dimensioned relative to opening 63" so that only a portion of corner radius 67a' fits within opening 63". This corner radius is reflected within the container also to make it easy for the animal to remove food from the interior corners and to aid in container cleaning. In this manner, a plurality of carousels 60 may be stacked upon one another for easy de-stacking without jamming or wedging together. Such stacking reduces storage space for carousels 60 when not in use. This stackability also facilitates automated filling of containers 64 by presenting a convenient format wherein the partially nested carousel containers and notches are rotationally aligned for loading a plurality of securely grouped carousels 60 into a machine capable of quickly removing one carousel 60 from the stack, locating and filling all of the food containers 64 therein with measured dosages of food or other substances, and then loading the next carousel 60.

The slight taper of side walls 65, corner radius 67a, and flat bottoms 67 provide for a shallow nesting of first carousel 60' into second carousel 60". As a result, a bottom 67' nesting within an opening 63" of second carousel 60" leaves enough clearance within container 64" so that food can be placed within container 64" without being contaminated by a nesting carousel 60'. As a result, carousels 60 can be placed in a nested condition even after having been loaded with food, thus saving space and making transport of food to the animals more efficient. In addition, this shallow nesting prevents nested carousels 60 from "sticking" to each other such that they become difficult to separate. Further, this nesting coordinates proper orientation of all of the carousel notches 66 in the stack for automatic dispensing from the stack in the machine, thus enabling filling of all containers 64 simultaneously without cross-migration of food between containers 64 or spillage of food outside the containers 64.

By providing a multiple dosage feeder with a plurality of containers, a plurality of dosages of food can be measured into and loaded and mounted to an animal cage simultaneously. By also providing a multiple dosage feeder with a food presentation member having a food opening which is coextensive with a single food container, a single dosage of food from a multiple dosage feeder can be presented to an animal within an animal cage. By providing a multiple dosage feeder for an animal cage with a protective food presentation portion, and an opening for receiving a carousel containing a plurality of food containers, multiple dosages of food can be selectively presented to animals within a cage without opening the cage. In addition, by providing a multiple dosage feeder with covers for all but one of the food containers, food or other substances within the containers may be kept protected from contamination or other damage until presented to the animal within a cage. By further providing a multiple dosage feeder having food containment carousels which are stackable upon one another, storage space for unused carousels is reduced, shipping costs are consequently reduced, and automated filling of food containers within the carousels is facilitated.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A multiple dosage feeder for a cage comprising:

a frame having a cage-interior side;

a food holding member rotatably mounted on the frame having a plurality of measured dosages of food or other substances, at least a portion of the food holding member extending to said cage-interior side; and a food presentation member disposed on the cage-interior side of the frame, the food presentation member permitting access to a single dosage of said plurality of dosages by an animal, at least a portion of the food holding member being rotatable within the food presentation member so as to selectively expose the single dosage of the plurality of dosages while the food presentation member prevents access to any remaining dosages on the cage-interior side of the frame.

2. The multiple dosage feeder for a cage of claim 1, wherein the food holding member is a carousel having a platform and a plurality of containers, each container being capable of holding one of the plurality of dosages.

3. The multiple dosage feeder for a cage of claim 1, wherein the food presentation member further comprises a cage-interior cover for covering a plurality of dosages on the cage-interior side of the frame.

4. The multiple dosage feeder for a cage of claim 3, wherein the cage-interior cover is further provided with a feeding opening for permitting access to the single dosage of said plurality of dosages.

5. The multiple dosage feeder for a cage of claim 1, wherein the food presentation member further includes a peripheral guard for guarding the periphery of the food holding member from the animal within the cage.

6. The multiple dosage feeder for a cage of claim 1, wherein the food presentation member further includes a lower guard for guarding the bottom of the food holding member from the animal within the cage.

7. The multiple dosage feeder for a cage of claim 1, further including a cage-exterior cover for covering the plurality of dosages on the cage-exterior side of the frame.

8. The multiple dosage feeder for a cage of claim 1, wherein the food holding member further includes a plurality of indicia for indicating the dosage to which the animal within the cage has access.

9. The multiple dosage feeder for a cage of claim 8, further including a cage-exterior cover for covering the plurality of dosages on the cage-exterior side of the frame, the cage-exterior cover having at least one indicator hole for permitting viewing of at least one of the plurality of indicia therethrough.

10. The multiple dosage feeder for a cage of claim 8, wherein the plurality of indicia are disposed on the outer surface of the food holding member.

11. The multiple dosage feeder for a cage of claim 1, wherein the food holding member further comprises a spindle, and the food holding member is rotatably fastened at the spindle to the frame by a fastener.

12. The multiple dosage feeder for a cage of claim 11, wherein the fastener is disposed substantially in the center of the frame in the horizontal direction.

13. The multiple dosage feeder for a cage of claim 11, wherein the fastener further comprises:

a drop lock hanger having a slot for receiving the spindle of the food holding member;

a slide retainer mounted to the drop lock hanger; and a drop lock slidably disposed between the drop lock hanger and the slide retainer, the drop lock having a retaining hole therein, the drop lock may be raised to allow the spindle to be received with the slot of the drop lock hanger, and the drop lock may be lowered so that the spindle is also received with the retaining hole of the drop lock.

14. The multiple dosage feeder for a cage of claim 1, further comprising indexing means for maintaining positioning of a selected dosage of said plurality of dosages.

\* \* \* \* \*